United States Patent Office 3,553,047
Patented Jan. 5, 1971

3,553,047
PROCESS FOR TREATING TEXTILES
George Frederick Godden, Harlow, England, assignor to Revertex Limited, London, England
No Drawing. Filed Apr. 6, 1967, Ser. No. 628,840
Claims priority, application Great Britain, Apr. 6, 1966, 15,381/66
Int. Cl. B31f 1/00
U.S. Cl. 156—209                                   7 Claims

ABSTRACT OF THE DISCLOSURE

In a process for backing a textile material by the steps of compounding a rubber latex mix from a latex selected from the group consisting of natural rubber latex, synthetic rubber latex, and a blend of such latices, a mineral filler and a gelling control agent comprising zinc oxide, adding a gelling agent to the mix, applying the mix to one side of said fabric, providing a pattern in the wet mix and subjecting the backed fabric to heat to gel and dry the patterned mix, the improvement which comprises using a stationary applicator for providing the pattern in the mix, the viscosity of the mix being such as to substantially retain said pattern therein.

This invention relates to a process for treating a textile material, and is particularly concerned with a process for backing textile fabrics, such as carpets.

In the specification of our copending patent application filed Nov. 30, 1964, under Ser. No. 414,857, now abandoned, later converted into a streamlined continuation application Ser. No. 719,765, now U.S. Pat. No. 3,486,920, there is described and claimed a process for backing a textile material, comprising the steps of compounding a rubber latex mix from natural rubber latex, synthetic rubber latex or a blend of such latices, a mineral filler and a gelling control agent comprosing zinc oxide, adding a gelling agent to the mix, applying the mix to one side of a textile fabric, heating the mix, embossing the exposed surface thereof and drying the mix, the concentration of gelling and gelling control agents being such as to ensure that the embossed pattern can be applied to and be retained by the mix until the mix has been dried.

In the Specification of British Pat. No. 1,094,607, there is described and claimed a process for backing a textile material, wherein there is applied to one side of a textile fabric material a compounded rubber latex mix which comprises a natural rubber latex, a synthetic rubber latex or a blend or such latices, a mineral filler and a gelling agent, and wherein the exposed surface of the mix is thereafter embossed to form a pattern thereon and heated while subject to embossing to set the mix in the required pattern, the gelled and embossed mix being thereafter dried.

With these processes, textiles or carpets may be produced with a more attractive and uniform appearance than if no pattern is employed. A further advantage of these embossed patterns is that it is possible to achieve a non-slip finish on the back of a textile or carpet with very much less rubber polymer than would be necessary if the compound were applied and not embossed.

We have now discovered that equally attractive patterns and equally good non-slip properties may be obtained by the present invention, according to which there is provided a process for backing a textile material, comprising the steps of compounding a rubber latex mix from natural rubber latex, synthetic rubber latex or a blend of such latices, a mineral filler and a gelling control agent comprising zinc oxide, adding a gelling agent to the mix, applying the mix to one side of a textile fabric using a stationary applicator shaped to provide a pattern in the wet mix, the viscosity of the mix being such as to substantially retain said pattern therein, and then subjecting the backed fabric to heat to gel and dry the mix in said pattern.

The applicator may be in the form of a comb applicator, or a patterned bar or patterned cylinder, and is held stationary above the fabric which is coated with the mix in the required pattern as it passes below the applicator. Preferably the mix is applied to the fabric at a rate not less than 500g. per square metre.

In one method of carrying out the process of the present invention, acarpet or textile material is coated with the wet compounded rubber latex mix, which is formulated so as to gel when subjected to heat, using a comb aplicator to give a corrugated pattern on the fabric. The fabric is then passed through a machine to gel, dry and vulcanise the mix. Preferably, a small amount of the mix, just sufficient to cover the fabric material completely, is applied by a straight doctor blade set just in front of the comb applicator relative to the direction of movement of the fabric material in relation to the applicator.

As indicated above, the compounded rubber latex mix can be of natural rubber latex, synthetic rubber latex or blends of these compounds with the conventional mineral fillers such as whiting, clay, barytes and silica. The mix also includes a gelling agent which is added just prior to use.

The vulcanisable latex itself, before the addition of the gelling agent, has a relatively long storage life of more than three months, and when mixed with the gelling agent, has a life of about twenty-four hours, so that the processor of the carpet or other fabric can purchase the vulcanisable latex from the manufacturer and prepare the latex for use by the addition of the gelling agent, as required.

The gelling agent may be any of those conventionally used for gelling latex, for example an ammonium salt such as ammonium chloride, ammonium sulphate or ammonium acetate, or a zinc ammonium salt such as zinc ammonium sulphate. Zinc oxide is added to the basic rubber latex mix to serve as a gelling control agent. Zinc oxide itself is not a gelling agent, but its presence is necessary to ensure the satisfactory gelation of the mix by the gelling agent, examples of which are given above. The zinc oxide may also have a secondary function as a vulcanizing agent where vulcanization is required.

The viscosity of the mix should preferably be such that the compound can be applied to give an even distribution of corrugations or patterns across the width of the fabric material substrate. The preferred viscosity is within the range of 12 to 16 poises when measured on a Ferranti Viscometer, model VH Spindle A Speed 3 at 18° C.

The resultant backing confers upon the textile fabric material, carpet, rug or the like good non-slip properties and a handle and stability that can only be achieved by the use of much greater weights of compound applied by a straight doctor blade. The process also imparts a good pile lock to a tufted carpet when the mix is applied directly to the back of the tufted carpet, or to a pile fabric, especially where this is a knitted pile fabric.

In order to enable the invention to be more readily understood an example thereof will now be described in greater detail.

A compounded rubber mix was prepared in a mixer from the following ingredients:

|  | Dry parts by wt. |
|---|---|
| Dispersing agent ("Anchoid") | 0.75 |
| Barytes | 225 |
| Titanium dioxide (rutile) | 7.7 |
| Casein, as ammoniated solution | 1.4 |
| Natural rubber, as latex | 100 |
| Sulphur | 1 |
| Mercaptobenzothiazole disulphide | 0.5 |
| Zinc diethyldithiocarbamate | 0.5 |
| Zinc dimethyldithiocarbamate | 0.5 |
| Sym-di-beta-naphthyl-p-phenylenediamine (antioxidant) | 0.25 |
| Zinc oxide | 4 |
| Water, to 80% total solids content. | |
| Fixed alkali solution of an acrylic copolymer | (¹) |

¹ 6-12 parts to give a viscosity of 14 poise on a Ferranti Viscometer VHA/3/18.

An aqueous solution of 20% ammonium acetate was stirred into the above compounded mix, the addition being 11 g. of 20% ammonium acetate to 341.6 g. of compounded rubber mix.

The compounded mix was spread by a straight doctor blade onto the back of a knitted pile fabric on a stenter. Immediately in front of the straight doctor blade was set a comb applicator and more of the mix was applied by the comb applicator to give a corrugated pattern, the total weight of mix being 20 to 24 dry ounces per square yard. The stentor was 60 feet long and the coated fabric was passed through a 3 foot long section containing gas heated infra red lamps immediately after the mix had been applied. In the heating section, the mix was dryed and vulcanised at 150° C. for 10 minutes to provide a rubber backed tufted carpet.

I claim:

1. In a process for backing a textile material by the steps of compounding a rubber latex mix from a latex selected from the group consisting of natural rubber latex, synthetic rubber latex, and a blend of such latices, a mineral filler and a gelling control agent comprising zinc oxide, adding a gelling agent to the mix, applying the mix to one side of said fabric, providing a pattern in the wet mix and subjecting the backed fabric to heat to gel and dry the patterned mix, the improvement which comprises using a stationary applicator for providing the pattern in the mix, the viscosity of the mix being such as to substantially retain said pattern therein.

2. A process as claimed in claim 1, wherein the fabric is first backed by an amount of the mix just sufficient to cover the fabric applied by a straight doctor blade set just in front of the applicator relative to the direction of movement of the fabric in relation to the applicator.

3. A process as claimed in claim 1, wherein the mix has a viscosity within the range of 12 to 16 poises when measured in a Ferranti Viscosimeter, Model VH, Spindle A, Speed 3 at 18° C.

4. A process as claimed in claim 1, wherein the mix is applied at a rate not less than 500 g. per square metre.

5. A process as claimed in claim 1, wherein the fabric is a tufted carpet and the mix is applied directly to the back of the tufted carpet.

6. A process as claimed in claim 1, wherein the fabric is a knitted pile fabric.

7. The process as claimed in claim 1, wherein said applicator is one of a comb, a patterned bar, and a patterned cylinder.

References Cited

UNITED STATES PATENTS

| 2,314,162 | 3/1943 | Reinhardt | 156—209X |
| 2,726,186 | 12/1955 | Alderfer | 156—209 |
| 2,803,577 | 8/1957 | Colt et al. | 156—209 |
| 3,075,865 | 1/1963 | Cochran | 156—72X |
| 3,166,465 | 1/1965 | Rahmes | 156—72X |
| 3,257,252 | 6/1966 | Keel | 156—209 |
| 3,385,751 | 5/1968 | Willard et al. | 156—72X |

SAMUEL W. ENGLE, Primary Examiner

U.S. Cl. X.R.

156—219; 161—66, 67, 94; 264—47, 171